United States Patent

[11] 3,616,922

| [72] | Inventor | Arthur George Turnock<br>Hockley, England |
|---|---|---|
| [21] | Appl. No. | 832,245 |
| [22] | Filed | June 11, 1969 |
| [45] | Patented | Nov. 2, 1971 |
| [73] | Assignee | Electromagnets Limited<br>Birmingham, England |
| [32] | Priority | June 29, 1968 |
| [33] | | Great Britain |
| [31] | | 31192/68 |

[54] MAGNETIC FILTER
5 Claims, 2 Drawing Figs.

| [52] | U.S. Cl. | 210/222 |
|---|---|---|
| [51] | Int. Cl. | B01d 35/06 |
| [50] | Field of Search | 210/222;<br>209/219 |

[56] References Cited
UNITED STATES PATENTS

| 2,822,089 | 2/1958 | Woodluff | 210/222 X |
|---|---|---|---|
| 3,139,403 | 6/1964 | Cramer et al. | 210/222 |

FOREIGN PATENTS

| 664,599 | 1/1952 | Great Britain | 210/222 |
|---|---|---|---|

Primary Examiner—Reuben Friedman
Assistant Examiner—T. A. Granger
Attorney—Kenway, Jenny and Hildreth

ABSTRACT: The invention provides a magnetic filter for removing magnetic particles from a fluid flowing past the filter. Regions of locally intensified magnetic field are formed by an elongated magnet member having a series of alternate North and South poles and at least one elongated intensification member of ferromagnetic material placed a short distance from the magnet member. The magnet member itself is removable from a support in such a way that collected magnetic particles remain on the unmagnetized support, to facilitate cleaning of the filter.

INVENTOR
Arthur George Turnock
BY
Kenway, Jenney & Hildreth
ATTORNEY

MAGNETIC FILTER

BACKGROUND

The invention relates to magnetic filters for filtering magnetic particles from a fluid.

A convenient way of removing magnetic particles from a fluid is to provide a magnetic field through parts of the fluid and associated magnetic poles adjacent to the fluid in order to attract magnetic particles and remove them from the fluid. The present invention is concerned with a particularly convenient arrangement of magnetic field and poles in order to provide an efficient filtering action.

A primary object of the invention is to provide a magnetic filter with regions of intense magnetization to provide an efficient filtering action.

A further object of the invention is to provide a magnetic filter which can be cleaned without difficulty. Further objects and advantages will be apparent from the description with reference to the drawings.

STATEMENT OF CASE

According to the invention there is provided a magnetic filter for filtering magnetic particles from a fluid comprising an elongated magnet member having a series of alternate north and south poles along its length and at least one elongated intensification member of ferromagnetic material placed a short distance from the magnet member whereby a substantial proportion of the magnetic flux between adjacent north and south poles passes into and through the intensification member, providing an intense magnetic field in the vicinity of each pole in the gap between the pole and the intensification member.

The intense magnetic field is particularly efficient at removing small magnetic particles from a fluid flowing through the magnetic field. In use, the filter is arranged in the flow path of a fluid which may contain magnetic particles and these particles are then removed from the fluid flow and adhere to the magnet member of the intensification member. Typical situations in which such a magnetic filter may be employed are in machine tool coolants circuits, ceramic slip flows, ceramic glaze or in any other liquid where it is desired to remove magnetic particles.

Preferably the intensification member is in the form of a rod lying parallel to the magnet member. The magnet member may be in the form of an elongated circular cylinder. There may be a plurality of intensification members arranged around the magnet member.

Preferably the intensification member or members are of a material having low remanence magnetization and are supported on an apertured end support through which the magnet member can slide with a close fit, whereby removal of the magnet member from the end support causes magnetic particles to be scraped off the magnet by the end member, the particles then being removable without difficulty from the substantially unmagnetized end member.

DESCRIPTION OF THE DRAWINGS

An embodiment of the invention will now be described by way of example only with reference to the accompanying drawings in which.

Figure 1:
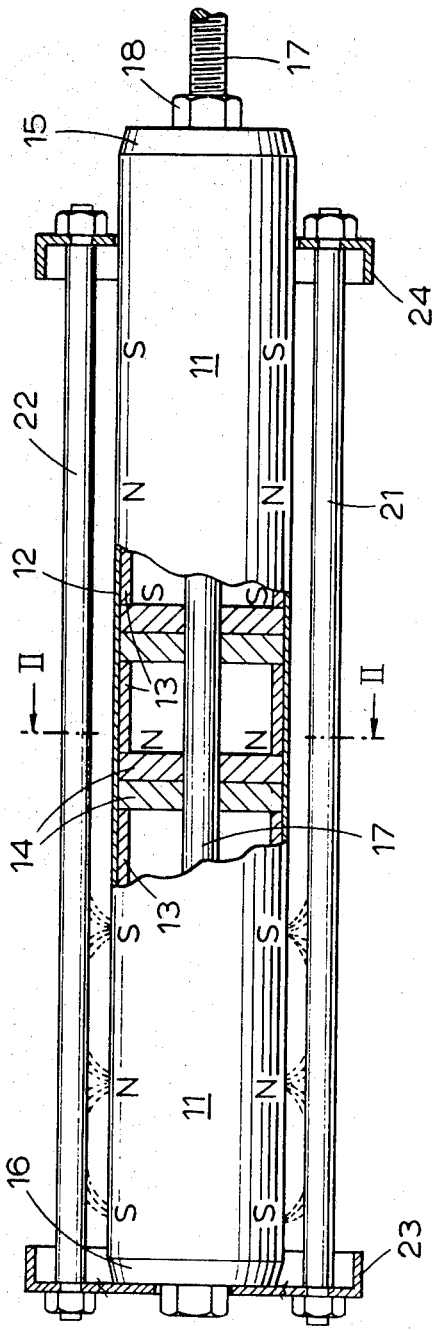
FIG. 1 is a diagrammatic side elevation, partly in section, of a magnetic filter according to the invention.
Figure 2:
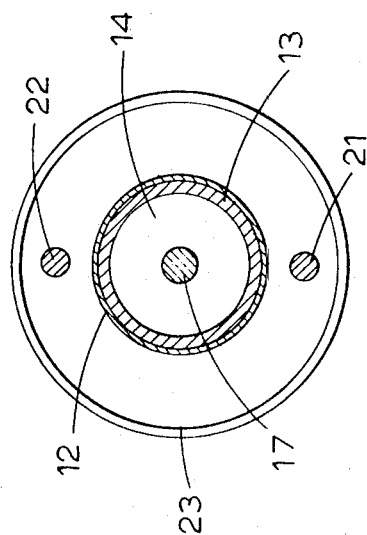
FIG. 2 is a section on the line II—II of FIG. 1.

A magnet member or magnet tube 11 includes a tubular skin 12 of nonmagnetic material within which are arranged a series of for example six tubular permanent magnets 13 each having a north pole at one end of the tube and a south pole at the other ends. Adjacent magnets 13 have like poles arranged adjacent each other so that along the length of the magnet tube 11 as a whole there are a series of alternating north and south poles as indicated by the references N and S. A series of disc-shaped pole pieces 14 are arranged between adjacent pairs of magnets.

The magnet tube 11 incorporates two end members 15 and 16. The end members 15 and 16 together with any spacers which may be required hold the magnet 13 and pole pieces 14 in position within the tubular skin 12 and these end members 15 and 16 are in turn secured in position by a threaded bar 17 and nut 18 of nonmagnetic material. The bar 17 passes through central apertures in the disc-shaped pole pieces 14.

The whole of the magnet tube described above is shown in position within an intensifier constituted by a pair of elongated intensification members 21 and 22 of magnetic material with low remanence magnetization such as mild steel, secured at both ends to end supports 23 and 24. The end support 24 incorporates an aperture corresponding to the diameter of the magnet tube 11 so that the magnet tube is a close fit within this end support. The other end support 23 provides an abutment for the end of the magnet tube 11. Instead of the two intensification members 21 and 22 shown, any other desired number of corresponding intensification members may be provided around the magnet tube 11, all equally spaced therefrom.

The series of magnetic poles N and S along the length of the magnet tube result in a series of intense regions of magnet field indicated by dotted lines of magnetic force for those poles towards the left-hand end of the drawing. There are corresponding regions of intense magnetic field along the length of the magnetic filter.

In use, the filter as a whole is inserted into a fluid from which it is desired to remove magnetic particles. Fluid is caused to flow past the filter with the result that any magnetic particles carried by the fluid tend to be deposited on the surface of the outer skin 12 or on the intensification members 21 and 22, in the regions of the intense magnetic field. After a certain amount of magnetic particles has been deposited on the filter in this way, the particles should be removed from the filter. In order to do this, the filter as a whole is removed from the fluid. Then, the magnet tube 11 is withdrawn from the intensifier and during this removal the close fit between the magnet tube 11 and the aperture in the end support 24 results in the magnet particles being scraped from the magnet tube 11. In the absence of the magnet tube 11, the magnetic particles are then removed easily from the now demagnetized intensifier.

The filter may then be reassembled and reinserted into the fluid in order to remove further magnetic particles.

A magnetic filter of this kind is particularly useful in removing very small magnetic particles from fluid due to the regions of intense magnetic field.

The nonmagnetic materials employed for the tubular skin 12, end members 15 and 16 and the bar 17 with its nut 18 may be brass or stainless steel or any other convenient material. The end support 23 and 24 of the intensifier should also preferably be of such a nonmagnetic material.

A series of magnetic filters as described above may be set up in two banks. The banks are arranged so that fluid flows through the two banks in turn. Thus when one bank is removed for cleaning the other bank remains in use so that completely continuous filtering can be achieved.

Having thus disclosed my invention and described a preferred embodiment thereof I claim as new and desire to secure by Letters Patent:

1. A magnetic filter for filtering magnetic particles from a fluid, comprising:
    a. a hollow elongated member,
    b. magnets disposed therein whereby a series of alternate north and south poles are disposed along the length of the member,
    c. at least one elongated intensification member of ferromagnetic material spaced apart from and extending parallel to the axis of the member whereby a major part of the magnetic circuit between adjacent north and south poles is through said intensification member, providing an intense magnetic field in the vicinity of each pole and extending between the member and the intensification member, d. said member and spaced-apart intensification member defining a fluid flow path therebetween whereby fluid flows through said magnetic field.

2. A magnetic filter as claimed in claim 1 in which the magnet member is in the form of an elongated circular cylinder.

3. A magnetic filter as claimed in claim 1 in which the intensification member is in the form of a rod lying parallel to the magnet member.

4. A magnetic filter as claimed in claim 2 in which there are a plurality of intensification members arranged around the magnet member.

5. A magnetic filter as claimed in claim 1 in which the intensification member or members are of a material having low remanence magnetization and are supported on an apertured end support through which the magnet member can slide with a close fit, whereby removal of the magnet member from the end support causes magnetic particles to be scraped off the magnet by the end member.